(12) United States Patent
Kildegaard et al.

(10) Patent No.: US 11,835,336 B2
(45) Date of Patent: Dec. 5, 2023

(54) MEASURING DEVICE FOR MEASURING UNEVENESS OF A SURFACE OF AN ITEM

(71) Applicant: LM Wind Power A/S, Kolding (DK)

(72) Inventors: Casper Kildegaard, Kolding (DK); Ya Min Jørgensen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 17/764,618

(22) PCT Filed: Jan. 22, 2021

(86) PCT No.: PCT/EP2021/051503
§ 371 (c)(1),
(2) Date: Mar. 29, 2022

(87) PCT Pub. No.: WO2021/148635
PCT Pub. Date: Jul. 29, 2021

(65) Prior Publication Data
US 2022/0404132 A1    Dec. 22, 2022

(30) Foreign Application Priority Data
Jan. 24, 2020  (GB) ..................... 2001031

(51) Int. Cl.
*G01B 5/207*  (2006.01)
*G01B 5/28*  (2006.01)

(52) U.S. Cl.
CPC ............. *G01B 5/207* (2013.01); *G01B 5/285* (2013.01)

(58) Field of Classification Search
None
See application file for complete search history.

(56) References Cited

U.S. PATENT DOCUMENTS

| | | | |
|---|---|---|---|
| 438,401 A | * | 10/1890 | Brown .................. G02C 13/005 33/561.1 |
| 4,209,387 A | | 6/1980 | Scherf |
| 4,997,510 A | | 3/1991 | Shinno et al. |
| 5,097,423 A | | 3/1992 | Badinger |
| 5,205,046 A | * | 4/1993 | Barnett .................. G01B 5/285 33/556 |

(Continued)

FOREIGN PATENT DOCUMENTS

| | | |
|---|---|---|
| CA | 1159248 A | 12/1983 |
| DE | 9301457 U1 | 6/1993 |

(Continued)

*Primary Examiner* — Christopher W Fulton
(74) *Attorney, Agent, or Firm* — Nath, Goldberg & Meyer; Jerald L. Meyer; Tanya E. Harkins

(57) ABSTRACT

The present invention relates to a measuring device for characterising a shape of a surface of an item, such as a wind turbine blade fibre layup, wherein the measuring device comprises: a frame comprising a holding frame, a first set of two or more probes movably held in the holding frame, each probe having a respective probe end for contacting the surface of the item, and electronic sensing means configured to provide for each probe a respective electrical signal representative of a position of the probe relative to the holding frame. A method for calibrating such a device is provided. Further, a method for characterising a shape of a surface of an item is provided.

25 Claims, 7 Drawing Sheets

(56) References Cited

U.S. PATENT DOCUMENTS

| | | |
|---|---|---|
| 5,554,808 A | 9/1996 | Chiao |
| 6,125,338 A | 9/2000 | Brienza et al. |
| 6,151,791 A * | 11/2000 | Shimazutsu ............ G01B 7/287 33/552 |
| 7,121,013 B2 * | 10/2006 | Herkt .................... G01B 3/002 33/551 |
| 8,294,758 B2 * | 10/2012 | Lynde .................. E21B 47/098 348/81 |
| 9,575,033 B1 | 2/2017 | Georgeson et al. |
| 2004/0146830 A1 | 7/2004 | Weinstein |
| 2005/0198849 A1 * | 9/2005 | Goeggelmann ........ A61B 90/06 33/552 |
| 2007/0022618 A1 * | 2/2007 | Kirstine .................. G01B 5/30 33/552 |
| 2007/0118313 A1 | 5/2007 | Vaccaro |
| 2007/0156066 A1 | 7/2007 | McGinley et al. |
| 2007/0165941 A1 | 7/2007 | Shinohara et al. |
| 2010/0329415 A1 | 12/2010 | Stiesdal et al. |
| 2011/0297303 A1 | 12/2011 | Borsting et al. |
| 2012/0033207 A1 | 2/2012 | Faidi et al. |
| 2012/0219034 A1 | 8/2012 | Nielsen |
| 2013/0088222 A1 | 4/2013 | Nissen |
| 2013/0176567 A1 | 7/2013 | Clemen, Jr. |
| 2013/0188858 A1 | 7/2013 | Lin et al. |
| 2014/0127473 A1 | 5/2014 | Kline |
| 2014/0360033 A1 * | 12/2014 | Miller ...................... A43D 1/02 33/515 |
| 2016/0102961 A1 * | 4/2016 | Lape ...................... G01B 5/207 702/150 |
| 2017/0046831 A1 | 2/2017 | Inagaki et al. |
| 2017/0212066 A1 | 7/2017 | Thompson et al. |
| 2017/0299381 A1 | 10/2017 | Bingham |

FOREIGN PATENT DOCUMENTS

| | | | | |
|---|---|---|---|---|
| EP | 2653829 A1 | 10/2013 | | |
| EP | 3009823 A1 | 2/2019 | | |
| WO | WO-9717281 A1 * | 5/1997 | ................ | B68F 3/00 |
| WO | WO-2006064442 A1 * | 6/2006 | ............ | G01B 21/20 |
| WO | 2017108689 A1 | 6/2017 | | |
| WO | 2018020162 A1 | 2/2018 | | |

\* cited by examiner

MEASURING DEVICE FOR MEASURING UNEVENESS OF A SURFACE OF AN ITEM

This is a National Phase Application filed under 35 U.S.C. 371 as a national stage of PCT/EP2021/051503, filed Jan. 22, 2021, an application claiming the benefit of Great Britain Application No. 2001031.0, filed Jan. 24, 2020, the content of each of which is hereby incorporated by reference in its entirety.

TECHNICAL FIELD

The present invention relates to characterising unevenness in the surface items, such as a collection of fibre layers laid up for manufacturing a fibre-reinforced composite component, for instance for a wind turbine blade.

BACKGROUND

Elongated structures such as wind turbine blades, airplane wings, and vessel hulls are often manufactured in fibre-reinforced composite material. Reinforcing material, such as glass fibres, is often arranged by stacking layers, for instance generally in a longitudinal direction of the elongated structure in order to provide stiffness in the longitudinal direction. Alignment of the stacked fibre layers is of paramount importance for the reliability, of the structure. Fibre misalignment can result in failure of the component. Therefore, locating a fibre misalignment or wrinkle is essential to remedying the problem. Knowing if there is a fibre misalignment defect in the elongated structure and being able to quantify any defects allows the manufacturer to take the necessary steps to avoid the defects in the first place or to eliminate them as soon as possible, eliminating the need for repair work in an otherwise completed fibre-reinforced composite component.

Today, one method for detecting fibre misalignments involves human visual inspection on the surface of the elongated structure with a flashlight, and the misalignments are quantified using very simple tools such as wrinkle comb and a ruler when a misalignment is visually observed. Such a visual inspection is very time consuming and inefficient for detecting smaller surface undulations. Ultrasonic testing methods have not proven sufficiently useful as a method for identifying and quantifying surface wrinkles. Ultrasonic test methods require that material be added to provide a contact surface between the sensor and the object under testing. This may easily contaminate the surface of the structure, which may cause weakness in the finished product. More importantly, such sensors are suitable for detection or quantification of surface wrinkles.

International patent application no. PCT/EP2016/081741 relates to a method comprising scanning an elongated structure by emitting an X-ray beam in an angle compared to the orientation of the fibres, detecting scattered rays, and determining an intensity of the detected scattered rays. While this method was found adequate in identifying deeper fibre misalignment or hidden fibre misalignments it is time-consuming and applying it to an entire wind turbine blade structure is expensive. US 2012/0033207 A1 relates to a system for inspecting a wind turbine blade including a scanning machine taking images of an interior portion of shells of a wind turbine blade; to a measuring apparatus for taking numerous measurements of a defect imaged within the shells of the wind turbine blade; and to a look-up table for ascertaining the theoretical strength of the wind turbine blade. US 2010/0329415 A1 discloses a method for inspecting a quality of a wind turbine blade, wherein the blade is inspected by a computer-tomography-method using radiation. A transmitter sends radiation through the blade and a receiver receives the radiation that has passed through the blade. The position of the transmitter, of the receiver and/or of the blade is changed in relation to each other in order to perform the inspection of the blade.

US 2004/146830 A1 discloses an apparatus for measuring a surface geometry of hard tissue covered by a layer of soft tissue, including a plurality of elements each having a tip adapted to penetrate said soft tissue and not substantially penetrate said hard tissue; a frame supporting movement of said elements, each along a path, such that a plurality of said tips, when positioned along the paths, define a surface; and at least one position sensor which generates a signal indicative of a tip position of at least one of said elements.

U.S. Pat. No. 5,097,423 A discloses a hand-held probe assembly with two fixed probe legs and two movable probe legs disposed in a linear array. A pair of probe legs, one of which is fixed and one of which is movable, is engageable with a first plate edge portion. A second pair of fixed and movable probe legs is engageable with a second plate edge portion. Retractable alignment legs engage a joint between the plate edge portions to aid in positioning the probe assembly relative to the plate edge portions.

US 2007/156066 A1 discloses a device for determining the shape and/or position of an anatomic surface and converting the data into machine readable form. The device includes a plurality of sensing probes positionable against an anatomic surface and a mechanism able to read the probe positions to determine the shape of the surface.

U.S. Pat. No. 6,125,338 A discloses a surface replicating and contour measuring device that substantially comprises a mechanical pin array having calibration pins mounted on a frame.

DE 93 01 457 U1 discloses a coordinate measuring device with probes for scanning the surface of an object to be measured and a displacement measuring device detecting the movement of the probes for determining the X, Y and Z coordinates of the scanned points.

U.S. Pat. No. 4,997,510 A discloses an automatic tape affixing apparatus including a tape affixing head movable in X-axis, Y-axis, Z-axis, A-axis and C-axis directions, a tape presser roller attached to the tape affixing head by a roller carrying member, the tape presser roller including a plurality of roller members disposed in a widthwise direction, the roller members being rotatably supported by a holding shaft held by the roller carrying member and being movable with respect to an adhesion form independently of one another, a guide mechanism for pivoting the tape affixing head along an arc locus the center of which is the tape presser roller and which is around an A axis, a displacement sensor for detecting the variation of distance between roller members in the opposite end portions of the tape presser roller and the roller carrying member, and control means for receiving a detection signal from the displacement sensor and pivoting the tape affixing head along the guide mechanism so as to make the distance in one end portion identical with the distance in the other end portion.

WO 2018/020162 A1 discloses a fibre-placement head suitable for being manipulated by a robot, comprising a movable die capable of moving tensioned rovings between a conveying device and a pressing roller.

US 2011/297303 A1 discloses a method of and an apparatus for manufacturing fibre-reinforced parts such as blades for wind power plants, whereby a number of layers of material comprising fibre are arranged on a curved surface of an elongated open mould so that some of the layers of material overlap at least partially.

These methods and devices are not necessarily sufficiently effective or efficient for identifying surface wrinkles, such as surface wrinkles in fibre layups.

Thus, there is a need for a simple solution for detecting fibre misalignments and/or wrinkles on the surface of an item.

SUMMARY OF THE INVENTION

In a first aspect, the invention provides a measuring device for characterising a shape of a surface of an item. The measuring device comprises:
- a frame comprising a holding frame,
    - a first set of two or more probes movably held in the holding frame, each probe having a respective probe end for contacting the surface of the item, and
    - electronic sensing means configured to provide for each probe a respective electrical signal representative of a position of the probe relative to the holding frame.

Such a device allows for characterising the shape of the surface of an item quickly and precisely. As an example, when laying up fibre material for a fibre-reinforced composite component, it is of great importance to identify places where the fibre is placed incorrectly. Wrinkles can indicate that a fibre mat has not been flattened, which means that there may be a significant volume that does not comprise any fibres, which can in turn lead to potential air pockets in the end product that will need to be filled, and/or to weakness that arise from the lack of reinforcing fibre in that volume.

It is clear to the person skilled in the art that a displacement is merely an aspect of a position of a probe relative to a holding frame. The displacement of a probe can only be determined with knowledge of a start position and an end position. On the other hand, knowing a start position and a displacement, an end position can be determined. Thus, a signal representative of a position can be converted to a signal representative of a displacement, and vice versa. Thus, the terms position and displacement are used interchangeably.

In some embodiments, each probe is connected to biasing means, such as a spring, configured to bias the probe to a corresponding neutral position relative to the holding frame. This allows for an automatic returning of the probes to a position from which they are ready to be displaced in a subsequent measurement. In some embodiments, each probe has individual corresponding biasing means. In some embodiments, each biasing means is connected to a corresponding force sensor configured to provide a corresponding force sensor signal which is representative of a tension in the corresponding biasing means, and the signal representative of the position of the probe is determined based at least in part on the corresponding force sensor signal. Examples of force sensors include a force-sensing resistor, a piezoelectric sensor, and a strain gauge.

A spring may be attached at one end to the holding frame and in the other end to the corresponding probe, for instance by engaging an end of the spring with a hole in the probe.

Other ways of biasing the probes to neutral positions may be used. An elastic member running across the holding frame may be arranged to bias the probes to respective extreme positions. When the measuring device is brought into contact with the surface, the probes will be displaced by force applied for instance by a user. In this case, the force applied to the biasing means is now provided by all probes. Therefore, a different type of position sensor is required in order to obtain more detailed useful information regarding the shape of the surface of the item. For instance, electronic sensing means based on the linear variable differential transformer (LVDT) principle may instead be used. Each probe is attached to an LVDT, allowing the position or displacement to be measured for each probe. Each probe may be movable in a shaft fixed to or incorporated in the holding frame. With this principle of operation, the displacement of a probe is converted to an electrical signal. Biasing means, such as described above, can be included to automatically return the probes to a neutral position after a measurement. A traditional coil or a co-moulded high-resolution conductive plastic coil can be used for the LVDT.

The LVDT principle can be used independently of the nature of the biasing means, and also without any biasing means.

In some embodiments, the electronic sensing means relies/rely on resistance measurements, such as the principle described below. This principle can be used with or without probe biasing means.

In a second aspect, the invention provides a resistance measuring device for determining a displacement of a displaceable member relative to a frame. The displaceable member has a conductor arranged on an outer surface of the displaceable member, the conductor extending from a first point on the displaceable member to a second point on the displaceable member, the frame having a first contact for contacting a first part of the conductor and a second contact for contacting a second part of the conductor, the conductor being arranged such that when the displaceable member is displaced relative to the frame, a point of contact between the first contact and the conductor and a point of contact between the second contact and the conductor change, whereby a length on an electric path between the first contact and the second contact changes, in turn changing an electrical resistance between the first contact and the second contact. In some embodiments, the displaceable member is substantially uniform along an axis of the displaceable member, and the first part and the second part of the conductor extend along, such as parallel to, the member axis, and first part and the second part of the conductor are connected by a connecting conductor portion. In some embodiments, the shape of the conductor visually resembles a "U". The bottom of the "U", i.e. the connecting conductor portion, may pass across an end of the displaceable member or may be arranged away from the end of member. The latter embodiment has the advantage that in case the member is to be repeatedly brought into contact with e.g. surfaces of items, as in the first aspect of the invention, the connecting conductor portion will not be gradually damaged by the repeated mechanical contact with the surfaces.

As mentioned, when the displaceable member is displaced in the frame, the length of the electrical path between the first contact and the second contact changes, in turn changing the resistance. Passing a current through the conductor from the first contact to the second contact allows for determining a resistance, for instance similar to how a resistance is measured by an Ohmmeter. A figure representative of the position of the probe relative to the frame can thereby be determined, for instance after calibration. It is typically not necessary that the actual resistance be determined.

The displaceable member advantageously has a uniform cross-section during some of its travel through the holding frame, such as a circular, oval, square, or rectangular cross-section. This allows for the displaceable member to easily travel in the frame. Means biasing the first and second contact onto the conductor can be used. In case the travel of the probe has a varying cross-section, such biasing means may be required.

Returning to the first aspect, in some embodiments, the measuring device is configured to cause determining of a signal representative of an unevenness of the surface based on the electrical signals representative of the position of at least two probes in the first set of probes. This determining may be performed by the device or by an external device receiving the information about the electrical signals representative of the position of the at least two probes in the first set of probes.

In some embodiments, the measuring device is configured to cause determining of an unevenness signal representative of an unevenness of the surface, the signal representative of the unevenness being representative of an angle between 1) a straight line through the probe end of a first probe of the first set of probes and the probe end of a second probe of the first set of probes and 2) a straight line through the probe end of the second probe and the probe end of a third probe of the first set of probes. According to such an embodiment, the fact that the probe ends of three probes are not all on a straight line is indicative of an unevenness of the surface. The need for only three probes for determining an unevenness makes the device very versatile, less complicated and easier to use. Also, the line between the ends of two of the first, second, and third probes, especially the two probes at either end of the holding frame, is often a reliable reference during measurements.

An unevenness signal representing a local unevenness can be obtained for instance based on 1) a line between the probe end of a first probe and the probe end of a second probe adjacent to the first probe and 2) a line between the probe end of the second probe and the probe end of a third probe adjacent to the second probe. The first, second, and third probes need not be sequential, but performing the determination based on a sequence of probes results in an unevenness signal representing the local unevenness more precisely.

An unevenness signal representing a local unevenness can also be obtained for instance based on 1) a line between the probe end of a first probe and the probe end of a second probe adjacent to the first probe and 2) a line between the probe end of the first probe and the probe end of a third probe adjacent to the second probe.

In some embodiments, the measuring device is configured to cause determining of a signal representative of an unevenness of the surface based at least on 1) the electrical signals representative of the positions of two of the probes relative to the holding frame and 2) a distance between said two probes, such as a smallest distance between the two probes, which in turn may for instance be determined as the smallest distance between the probe ends of the two probes. In a device with parallel probes, the smallest distance may for instance be the length of the gap between the probe ends of the two probes, such as the length of the gap during measuring. Generally, the probes are parallel in embodiments of the present invention. In some embodiments, one or more probes may travel non-parallelly with one or more other probes.

In some embodiments, the measuring device is configured to cause determining whether the signal representative of the unevenness of the surface meets an unevenness criterion, and in the affirmative, to cause provision of an unevenness indication. In some embodiments, the unevenness indication comprises an audible signal and/or a visual signal and/or a vibration signal. The device may itself be adapted to provide such a signal, or it may cause an external device to provide such a signal. This may simplify the measuring device but requires that an external device be available to provide such a signal. Depending on the use scenario, one or the other option is preferable.

In some embodiments, at least a subset of the first set of probes is arranged in a one-dimensional array. The probes may be arranged with different mutual distances or equidistantly.

In some embodiments, at least a subset of the first set of probes is arranged in a two-dimensional array. The probes in each row may be arranged with different mutual distances or equidistantly. The distance between probes in a row and a distance between rows may be the same or different.

Generally, uniform distances make the device simpler, and the position of a given probe can be determined based one more indices and knowledge of the distance between two neighbouring probes. For instance, the distance between probe number 10 and probe 1 is 9 times the distance between probe 1 and probe 2. The same applies for devices with two-dimensional arrays of probes.

In some embodiments, each probe is movably maintained in a respective position by a frictional force exceeding a force corresponding to the standard acceleration of free fall, $g_0$. This means that the probes can be reset and will stay in the reset position (if no biasing is applied) when only the field of gravity is applied to the probes. When a user presses the device against a surface using a sufficient force, the frictional forces are overcome, and the probes will conform to the shape of the surface. A frictional force exceeding a force corresponding to at least 1.1 times, such as at least 1.5 times, the standard acceleration of free fall, $g_0$, will reduce the risk that the probes unintentionally displace in the holding frame under normal handling of the device.

In some embodiments, the frame further comprises one or more fixed or fixatable supporting legs for supporting the measuring device on the surface of the item during obtaining of the electrical signals representative of the positions of the probes relative to the holding frame. Such one or more legs can act as a reference when in contact with the surface. In case only a single leg is used, the end of the leg is preferably flat. Using two or more legs may provide more stability and a better reference. A device with at least three supporting legs (arrange as a tripod) may allow the device to rest on a surface without being held for instance by a user. Four or more legs may be advantageous in some cases.

When the legs are movable relative to the holding frame, but fixatable, the device can be configured to different use cases. This can be used to change the offset between the ends of the supporting legs and the ends of the probes.

In some embodiments, the supporting legs include one or more pressure sensors, such as one for each leg, arranged to sense whether the supporting legs are in contact with a surface. In some embodiments, the device provides a warning signal if it detects that the supporting legs are not in contact with a surface, or the device does not provide a measurement.

In some embodiments, the device is configured such that a weight of the frame exceeds a maximum total force that the first set of probes can exert. On a device with supporting legs, a user may place the device on the supporting leg or legs and obtain a measurement without the need to apply additional force.

In some embodiments, the probe ends of two probes of the first set of probes are separated by a distance of at least 10 cm, such as at least 20 cm. Depending on the dimension of the wrinkles, the number of probes may be higher or lower.

The number of probes per distance can be increased in order to improve the resolution of the measurements. An average distance in the range 0.2-1.5 cm, such as in the range 0.4-1.2 cm, such as in the range 0.5-1 cm, has been found to be well suited for characterising wrinkles in fibre layups for fibre-reinforced composite components.

In some embodiments, the measuring device is operable to communicate to an external device:
- a signal representative of the electrical signals corresponding to at least two of the probes, and/or
- a signal representative of an unevenness of the surface of the item determined based on the electrical signals representative of the positions of at least two of the probes.

A third aspect of the invention provides a method for characterising a shape of a surface of an item, comprising:
- providing two or more probes movably held in a holding frame, each probe having a corresponding probe end for contacting the surface of the item,
- bringing at least two of the probe ends into contact with the surface of the item,
- obtaining electrical signals representative of corresponding positions of at least two of the probes relative to the holding frame.

In some embodiments, the method comprises:
- bringing at least three probe ends into contact with the surface of the item,
- determining an unevenness signal representative of an unevenness of the surface, the unevenness signal being representative of an angle between 1) a straight line through the probe end of a first probe of the first set of probes and the probe end of a second probe of the first set of probes and 2) a straight line through the probe end of the second probe and the probe end of a third probe of the first set of probes.

Equivalent lines can be used instead, as the lines are directly associated with the position of the individual probes. Thus, the line between two probe ends is also represented by the relative displacement or position between the two probes (if probes have different initial distances from the surface of the item before being brought into contact with the surface of the item, such differences may need to be taken into account in the determination).

In some embodiments, the method further comprises obtaining the respective electrical signals at least when the holding frame is at a first position relative to the item and when the holding frame is at a second position relative to the item different from the first position. In particular embodiments, the method comprises moving the holding frame from the first position to the second position while at least two of the probes are in contact with the surface of the item. Such a continuous movement allows for a thorough characterization of the surface and allows for extraction of information of three-dimensional information about the shape of the surface. In some embodiments, a device having only a one-dimensional array of probes is used.

In some embodiments, the method further comprises determining an unevenness signal representative of an unevenness of the surface of the item based on the electrical signals representative of the positions of at least two of the probes relative to the holding frame. In some embodiments, the method further comprises determining whether the signal representative of an unevenness of the surface meets an unevenness criterion, and in the affirmative, to cause provision of an unevenness indication.

In some embodiments, the unevenness indication comprises an audible signal and/or a visual signal and/or a vibration signal.

In some embodiments, the method further comprises storing data representing at least a part of the obtained electrical signals on an electronic storage medium, such as in digital or analogue format.

The further features disclosed in relation to the first aspect of the invention generally apply mutatis mutandis to the third aspect and can therefore be included in embodiments of the third aspect where compatible. Therefore, these features will not be repeated here.

A fourth aspect of the invention provides a method for preparing a fibre layup for a fibre-reinforced wind turbine blade. The method comprises:
- laying up fibre material in a mould,
- characterising a surface of the fibre material layup using a method in accordance with an embodiment of the third aspect or using a device in accordance with the first aspect of the invention.

Using a method in accordance with the fourth aspect, the layup can be monitored frequently in order to ensure that the layup remains wrinkle-free. In some embodiments, the step of characterising is performed during the layup, before all fibre material is laid up. This allows for identifying wrinkles at an early stage of formation, whereby staff can rearrange the fibre right away rather than having to remove many layers after the layup is completed. Thus, in some embodiments, the method comprises:
- monitoring whether an unevenness is formed during laying up the fibre material by determining that the unevenness signal meets an unevenness criterion, and
- rearranging the fibre material to eliminate the unevenness if the unevenness signal meets the unevenness criterion.

In some embodiments, the unevenness criterion or an unevenness threshold, if used, is adapted for instance in accordance with a thickness of material laid up or to be laid up, or in accordance with another parameter that corresponds to the thickness, such as a number of layers laid up. For instance, the unevenness criterion may include that a bump is detected, determined for instance by determining that a probe end of a specific probe in contact with the surface of the item is either lower or higher than the probe ends of two probes located on either side of the specific probe, for instance (the) two probes adjacent to the specific probe. Other unevenness criteria may be used, depending on the intended shape and other conditions. What may appear to be an unevenness may in some cases be part of the intended shape, in which case an unevenness will be present when the actual shape deviates above a threshold or other criterion from the intended shape, that is, the unevenness criterion uses the intended shape as a baseline.

At the beginning of the layup process, wrinkles are potentially quite small. However, a deviation is still important and may be an indication of a problem. If necessary, the fibre material can be rearranged to prevent formation of significant wrinkles. As the process proceeds, the unevenness criteria may be adjusted to require a larger unevenness before an alert is given if the unevenness is either intended or does not compromise the strength of the product, once completed.

A fifth aspect of the invention provides a method for calibrating a device in accordance with the first aspect of the invention where the device has one or more supporting legs. The method comprises:

placing the device on the one or more supporting legs on a surface and storing reference information including storing a reference signal representative of the electrical signal provided by the electronic sensing means for each probe in a second set of one or more of the probes in the first set of probes, such as all the probes in the first set of probes, and during subsequent use, determining for at least one probe in the second set of probes, such as for all the probes in the second set of probes, a signal representative of a difference between the electrical signal measured during said use and the corresponding reference signal.

Such a method has a number of advantages. For instance, it allows for elimination of certain systematic errors in the device. The properties of the biasing means, if present, may change over time, which may give rise to erroneous conclusions. By placing the device on an entirely flat surface and taking measurements, the signals presenting a flat surface can be recorded and used as a reference. If the device is subsequently used to measure an entirely flat surface, a set of electrical signals resembling the recorded reference signals are expected. The one or more supporting legs ensure that the reference is applicable after moving the device to a production surface.

Another advantage is that in case a curved surface shape is intended, the device can be calibrated on a surface having the intended shape. When used in production, the reference signals ensure that the probe displacements are determined from the reference positions of the probe ends, not from a neutral position.

Although the invention has been described with respect in particular to fibre layups for fibre-reinforced composite components, such as components for wind turbine blades, the invention is applicable in many other fields where it is important to quickly and easily characterise the surface of an item.

BRIEF DESCRIPTION OF THE DRAWINGS

FIG. 3b illustrates the wrinkle indicated in the fibre layup illustrated in FIG. 3a.

FIG. 5 illustrates data representing the shape of the surface of an item, measured using the measuring device from FIG. 4a.

DETAILED DESCRIPTION OF SELECTED EMBODIMENTS

Figure 1:
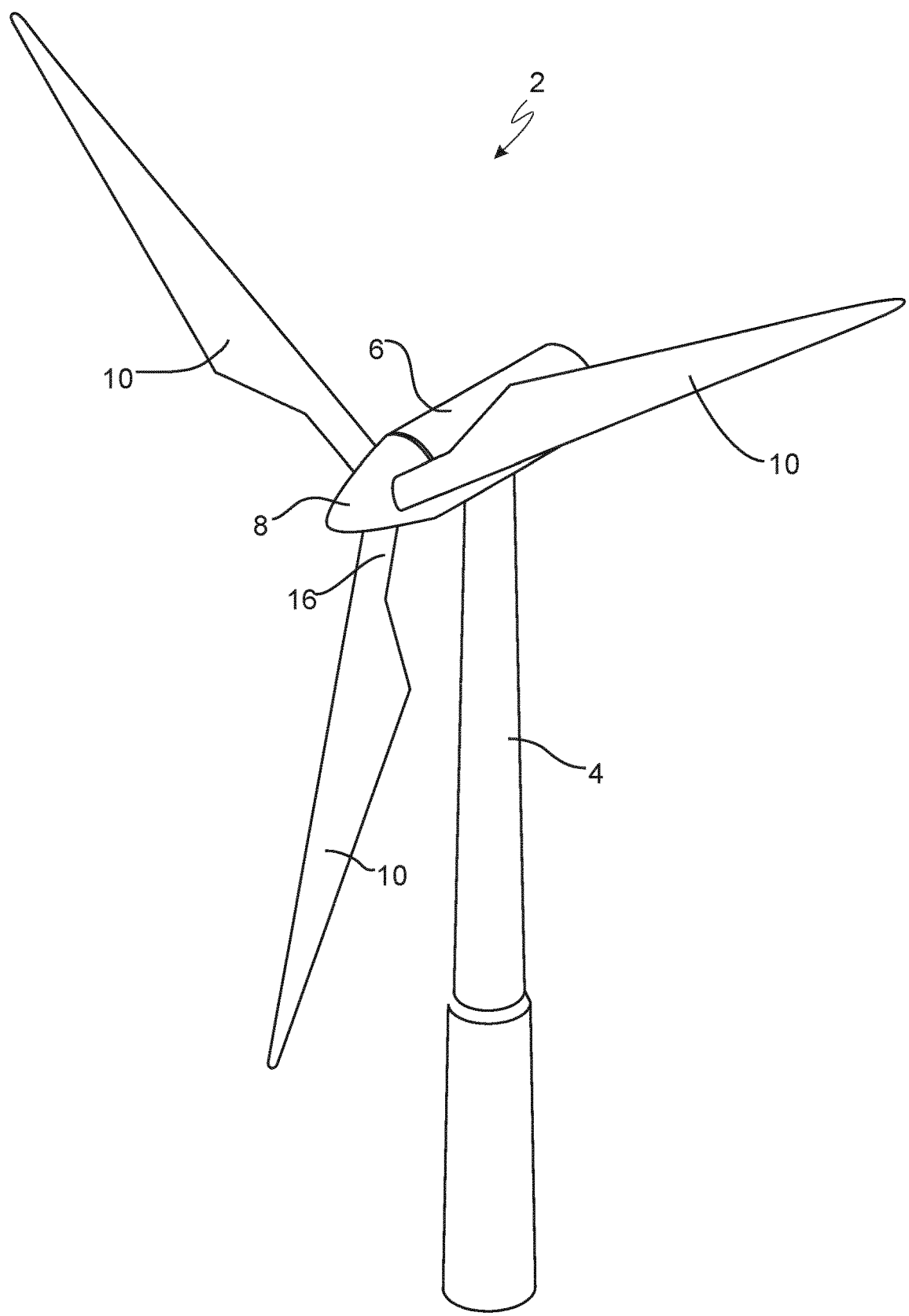
FIG. 1 shows a schematic view of a wind turbine having three wind turbine blades.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8.

In many cases, each wind turbine blade 10 is made of two blade shell parts, typically made of fibre-reinforced polymer. The blade shell parts are attached to one another with adhesive, such as glue, along bond lines or glue joints extending along the trailing edge and the leading edge of the blade 10. Typically, the root ends of the blade shell parts have a semi-circular or semi-oval outer cross-sectional shape.

Figure 2A:
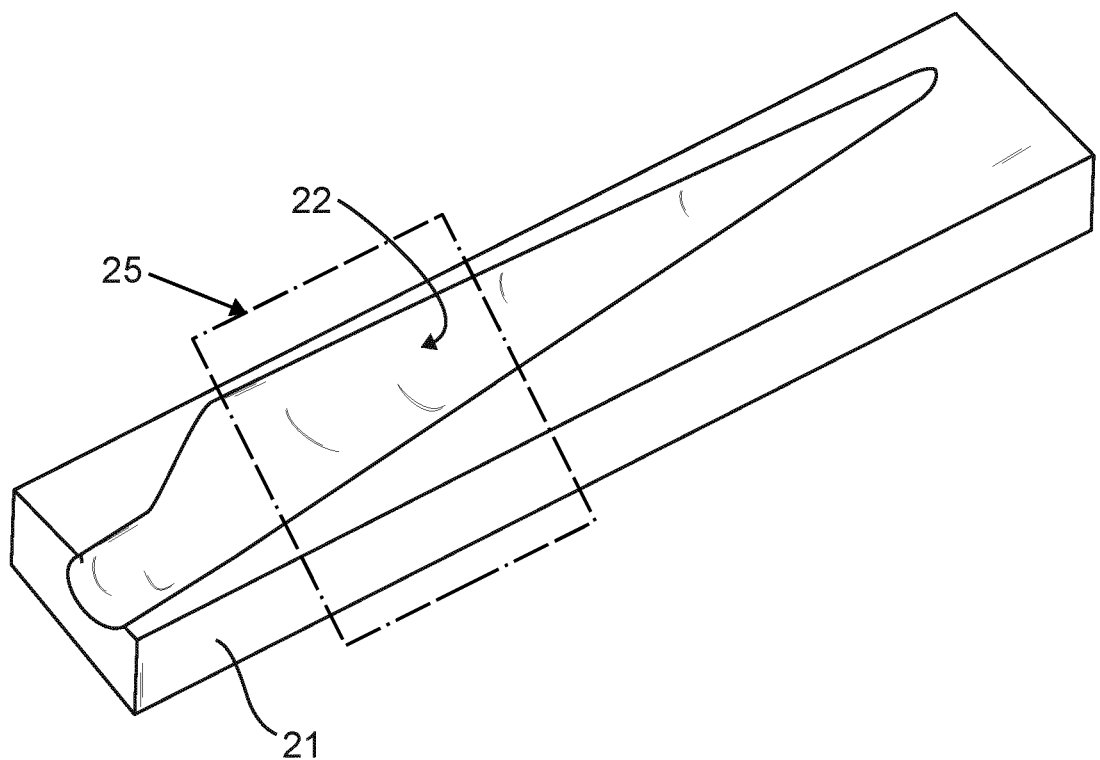
FIG. 2a is a schematic illustration of an exemplary mould for a wind turbine blade shell part.

FIG. 2a illustrates a mould 21 for manufacturing a wind turbine blade shell part. The aerodynamic shell parts are sometimes made using Vacuum Assisted Resin Transfer Moulding (VARTM), where a plurality of e.g. glass fibre mats and/or carbon fibre mats, and in some cases other materials, are arranged on the mould surface 22 of the mould. After these materials have been stacked according to the shape of the wind turbine blade shell part, a flexible vacuum bag is arranged on top of the fibre mats and sealed against the mould 21, thereby forming a mould cavity that contains the fibre mats. Resin inlets and vacuum outlets are connected to the mould cavity in preparation for a process known as infusion. The inlets allow resin to be introduced into the mould cavity, and the outlets allow air to be removed. When using dry fibre in the layup process, resin must be provided to impregnate the fibre materials in the mould cavity. The mould cavity is evacuated via the vacuum outlets, which forms an underpressure (also known as a negative pressure), such as for instance 5-10% of standard pressure, 101.325 kPa, preferably lower, in the mould cavity, after which a supply of liquid resin is provided via the resin inlets. The resin is forced into the mould cavity at least due to the pressure differential created by the evacuation. Resin disperses in different directions in the mould cavity due to the negative pressure, driving the resin flow front(s) towards the vacuum outlets. In the mould cavity, the resin impregnates the fibre material. When the fibre material has been fully impregnated, the resin is cured, resulting in a fibre-reinforced composite component such as a shell part for a wind turbine blade.

Figure 2B:
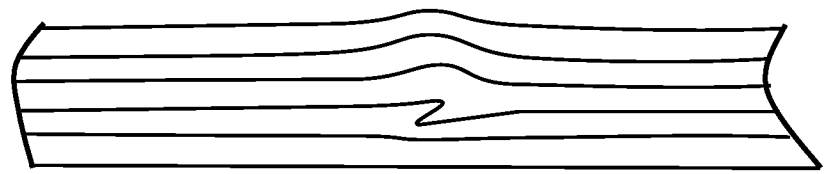
FIGS. 2b, 2c, and 2d illustrate different issues that may cause surface wrinkles in a fibre layup.
Figure 2C:
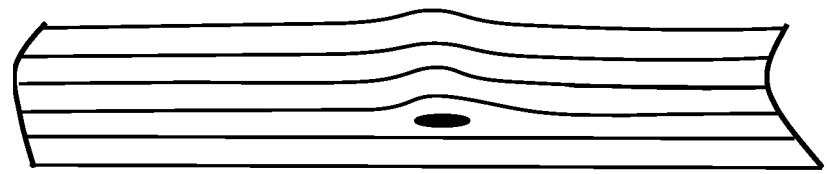
Figure 2D:
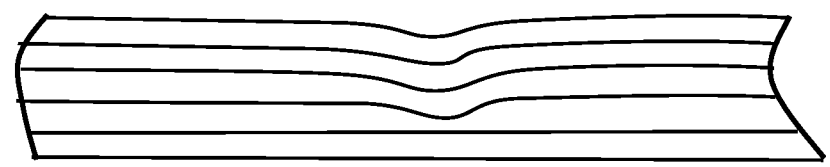

FIGS. 2b-2d illustrate different origins of surface wrinkles. FIG. 2b illustrates a surface wrinkle cause by an unintended fold in one of the fibre mats during layup. FIG. 2c illustrates a foreign object causing the surface to exhibit a wrinkle. FIG. 2d illustrates a dip that may be caused for instance by an object having been pressed against the layup. It is important to identify and eliminate such causes to the extent that they adversely affect the quality of the end product.

Figure 3A:
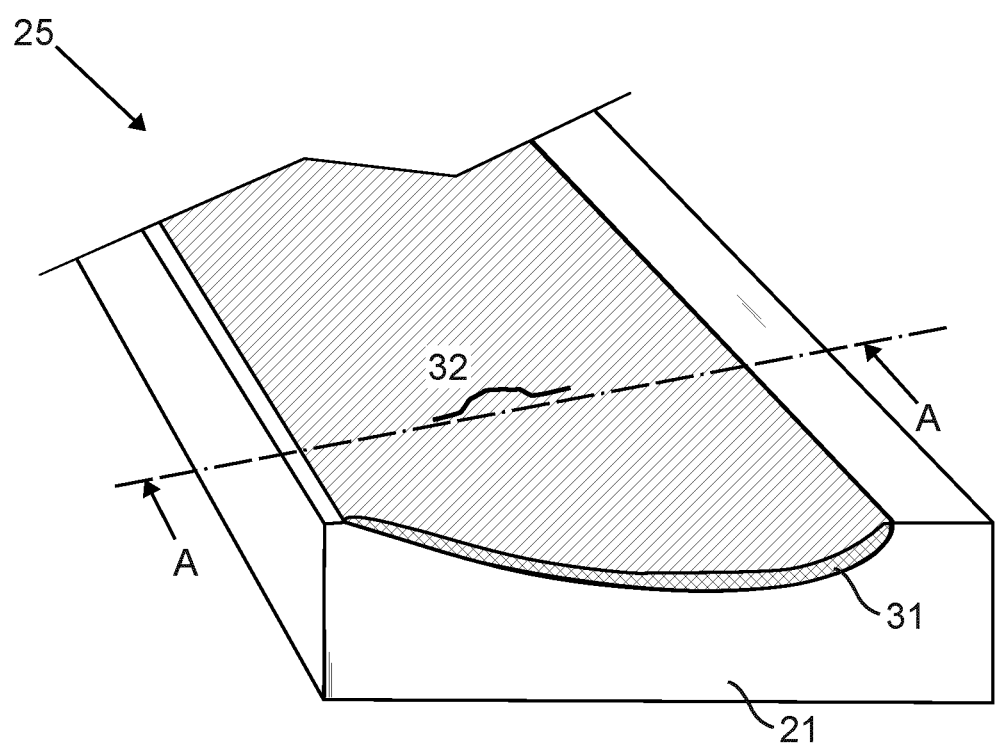
FIG. 3a illustrates part of mould with fibre material laid up in a process for manufacturing a fibre-reinforced composite component.

The mould section 25 of the mould 21 shown in FIG. 2a is illustrated in more detail in FIG. 3a. FIG. 3a illustrates the mould section 25 with fibre material 31 arranged on the mould surface. As described above, this process is performed before arranging the vacuum bag and providing resin. As part of the layup process, various quality control processes are performed to identify and eliminate potential defects. Defects can lead a mechanically weak end products, or end products that fail to meet specifications in other ways, for instance by a discrepancy in weight or in shape. Wrinkles at the surface of the layup 31 are a symptom that the layup does not meet the requirements and may be caused for instance as described in relation to FIGS. 2b-2d.

FIG. 3a schematically illustrates a wrinkle 32 in the layup, in this case a locally raised portion caused for instance by a foreign object on one of the fibre mats in the layup or by a fold in a fibre mat, as described in relation to FIGS. 2b and 2c.

Wrinkles are not necessarily visible, and therefore frequent measurements may be desirable in order to determine whether the layup has wrinkles.

Figure 3B:
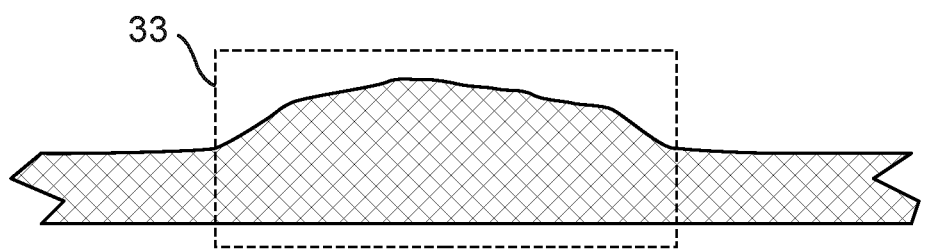

FIG. 3b illustrates part of the cross-section A-A indicated in FIG. 3a, in particular the profile of the wrinkle 32. If this part of the layup is supposed to be substantially flat, the wrinkled region 33 is a deviation from the intended shape and may potentially lead to quality issues. Outside the region 33, the layup is substantially flat as intended in the present example. Whether the wrinkled region 33 exceeds an acceptable degree of unevenness may be evaluated using different criteria. For instance, a deviation from some reference shape may exceed an acceptable limit, in which case corrective measures must be taken in order to ensure that the product meets the quality criteria. If the deviation is below the acceptable limit, the quality criteria are met. Fibre-layups are subject to certain variability, and a certain degree of deviation is unavoidable. Such variations may not have any impact on the quality of the end product, and thus a certain deviation is perfectly allowable. Any deviation that may affect the quality of the end product is eliminated.

Figure 4A:
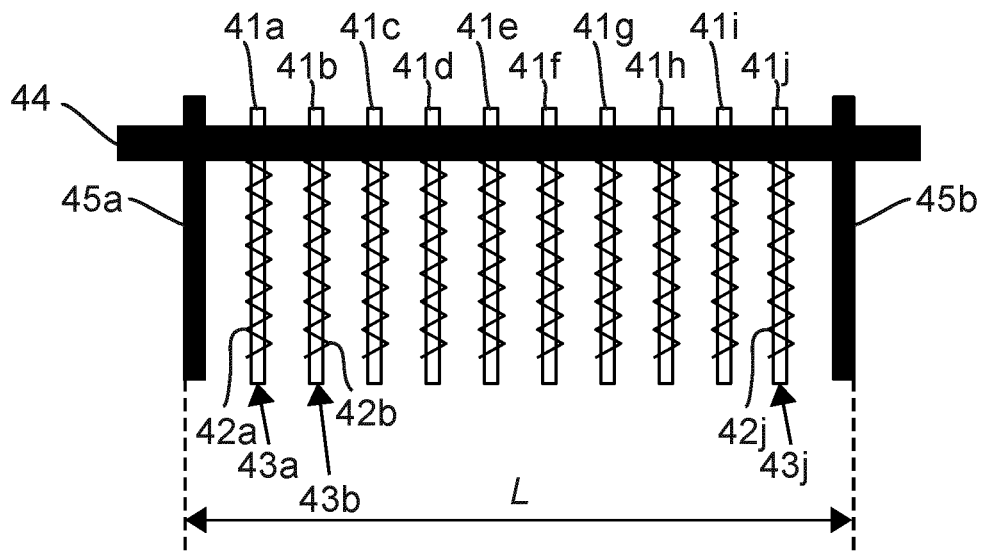
FIG. 4a illustrates a measuring device in accordance with an embodiment of the invention.

FIG. 4a illustrates a wrinkle measuring device 40 for evaluating the evenness of the surface of an item, such as a fibre layup for a wind turbine blade shell part. The device 40 comprises a holding frame 44, which holds a number of probes 41a-41j, in this case 10 probes. In this example, supporting legs 45a and 45b on which the device can be placed are attached to the holding frame 44. These may act as a reference, allowing for the determination of the position of the probes 41a-41j relative to the holding frame 44. In the present case, the probes 41a-41j are biased, as illustrated by springs 42a, 42b, and 42j, which bias corresponding probes 41a, 41b, and 41j to a neutral position. Springs are also provided on the rest of the probes, as illustrated in FIG. 4a. Each probe 41a-41j further has a probe end for engaging with the surface of the item to be characterized. References 43a, 43b, and 43j in FIG. 4a illustrate the probe ends of probes 41a, 41b, and 41j, respectively.

The device 40 is also partly characterized by a length, L, as shown in FIG. 4a. The length can for instance be dictated by the typical size of wrinkles. The number of probes results in a certain resolution. The more probes within a given device length L, the better the resolution. A device having a length of 15 cm and having 10 equidistant probes identifies a range of typical wrinkles. A longer device with the same or a different number of probes identifies a corresponding range of wrinkles. In some cases, 10 probes are sufficient. In other cases, more probes may be necessary, such as at least 15, such as at least 20 probes. The probes may span for instance at least 10 cm, such as at least 15 cm, such as 20 cm or more.

In FIG. 4a, the probes 41a-41j are in their neutral position. In the present example, the probe ends all have the same distance from the holding frame 44. In other words, on a flat surface, all the probe ends 43a-43j will be in contact with the surface and will be displaced equally from their respective neutral position. Supporting legs 45a, 45b allow the device to be brought into contact with a surface in a steady manner, and if the supporting legs of the device 40 in FIG. 4a rest on a flat surface, all probes 41a-41j will be displaced from the neutral position by the same amount. The device 40 is configured such that when the supporting legs 45a, 45b are in contact with a flat surface, all probes 41a-41j are displaced by a non-zero amount. This can ensure that an entirely flat surface may be actively identified by the device.

Springs 42a-42j are coupled to force sensors (not shown) that provide electrical signals representing the degree of displacement of the corresponding probes. The more displaced a probe is, the more tense its corresponding spring, and the more force the corresponding force sensor will experience, thus correlating the displacement to the measured signal.

Figure 4B:
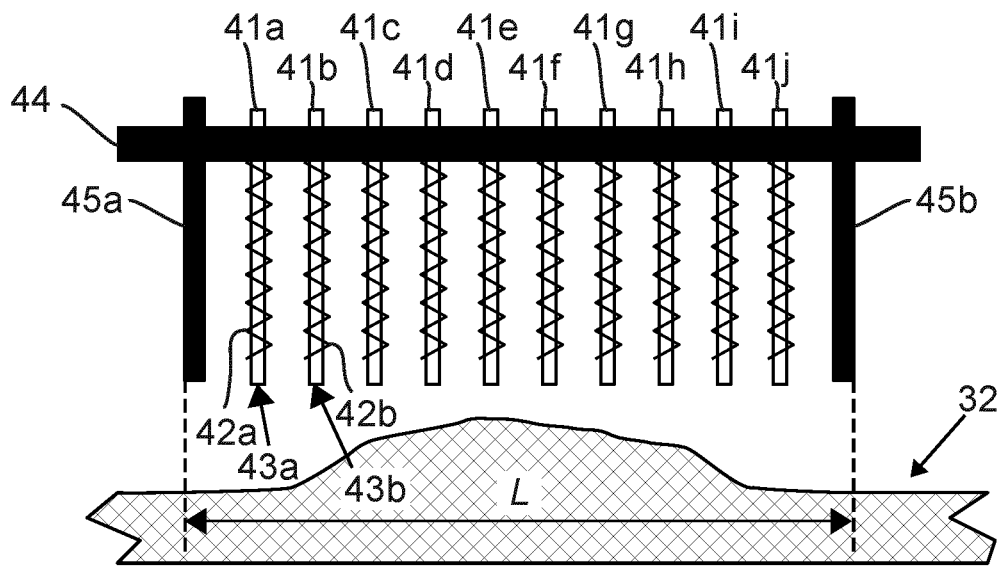
FIGS. 4b, 4c, and 4d illustrate use the measuring device from FIG. 4a for characterising the shape of the surface of an item.

FIG. 4b shows the device 40 being brought into use for characterising the wrinkle 32. The device 40 is in the neutral position in which the probes are in their neutral positions.

Figure 4C:
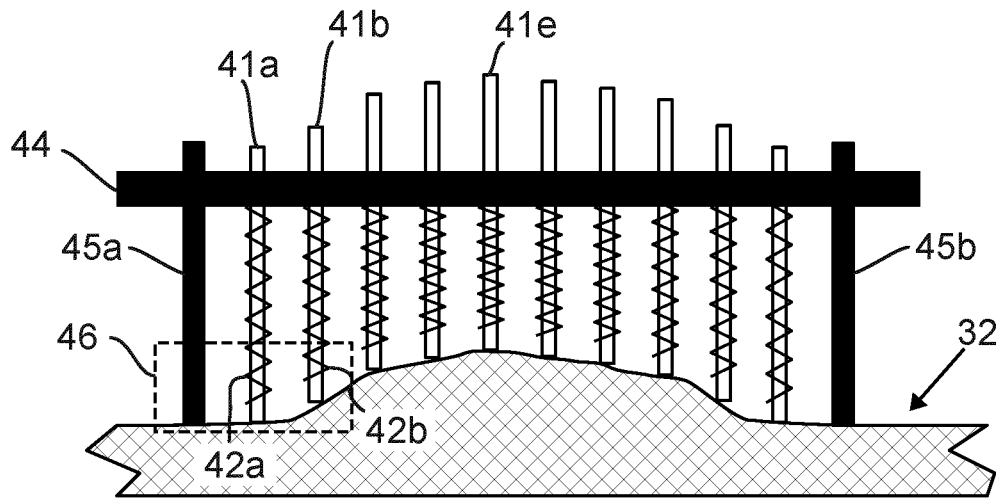

FIG. 4c illustrates the device 40 arranged on the surface of the fibre layup at the wrinkle 32, the supporting legs being placed on the surface of the item. The probes are displaced by an amount corresponding to the shape of the surface. Due to the bias by the springs, the probe ends are forced into contact with the surface. As can be seen in FIG. 4c, the springs are under different tension depending on the surface beneath the corresponding probe end. This translated into electrical signals of different magnitudes representing the different displacements. Probe 41a is displaced very slightly from the neutral position shown in FIGS. 4a and 4b. The probe 41b next to probe 41a is displaced by a larger amount, indicating that there is a wrinkle. Probe 41e is displaced the most, indicating the height of the wrinkle 32 relative to the supporting legs 45a and 45b.

Figure 4D:
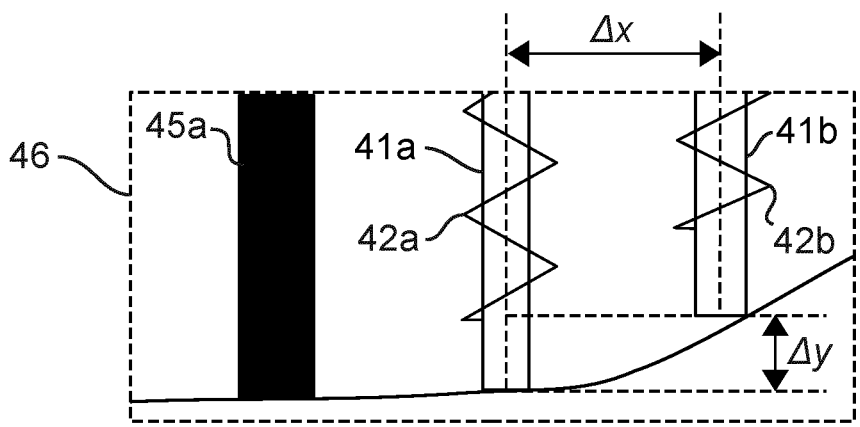

FIG. 4d illustrates the detail 46 of FIG. 4c. In particular, it shows parts of supporting leg 45a and parts of probes 41a and 41b and their corresponding springs 42a and 42b. A difference in electrical signals produced by the device 40 in response to the displacement of the probes 41a and 41b exists because the probes 41a and 41b are displaced by different amounts. The difference in the electrical signals represents the difference $\Delta y$ between the displacement of probe 41a and that of probe 41b. Based on the electrical signals representative of the position of the probes, the device may communicate information relating to the positions/displacements of the probes. In order to inform a user of characteristics relating to the surface, the device may itself communicate information or an alert, for instance via a built-in display, speaker device, or vibration device, or any combination thereof. More or less detailed information can be provided, according to the needs of the user. A displacement amount for each sensor can be displayed on a display. In a simpler embodiment, the device is configured to communicate an alert, visually, audibly or vibrationally, in case the surface unevenness meets unevenness criteria. For instance, if a single probe is displaced by an amount that exceeds an acceptable threshold, the device may communicate an alert. Alternatively, the device can evaluate unevenness based on the relative displacement from one probe to the next. As another example, if the wrinkle is only affecting a few probes, such as probes 41e-41g, the wrinkle may be deemed small enough that it is known that it will not affect the quality of the end product, optionally unless another criterion dictates otherwise, for instance because the displacement of one of those probes exceeds an acceptable threshold. In some cases, the device may be used on a curved surface. In that case, the intended shape will be such that different probes are displaced by different amounts. In this case, the unevenness criteria are related to displacement of probes away from the intended curved shape of the surface.

FIG. 4d also schematically illustrates a distance $\Delta x$ between two neighbouring probes 41a and 41b. With knowledge of this distance, a figure representative of an angle $\alpha$ of the surface between probes 41a and 41b relative to a line between the points of contact of the supporting legs 45a, 45b can be determined as measure of the unevenness of the surface. The slope $\Delta y/\Delta x$ is itself a representation of the unevenness of the surface between probes 41a and 41b. If an angle is desired as an output or as a variable for determining whether an unevenness criterion is met, a representative angle $\alpha$ of the surface between probes 41a and 41b can be determined for instance using the equation $\tan(\alpha)=\Delta/\Delta x$.

Figure 5:
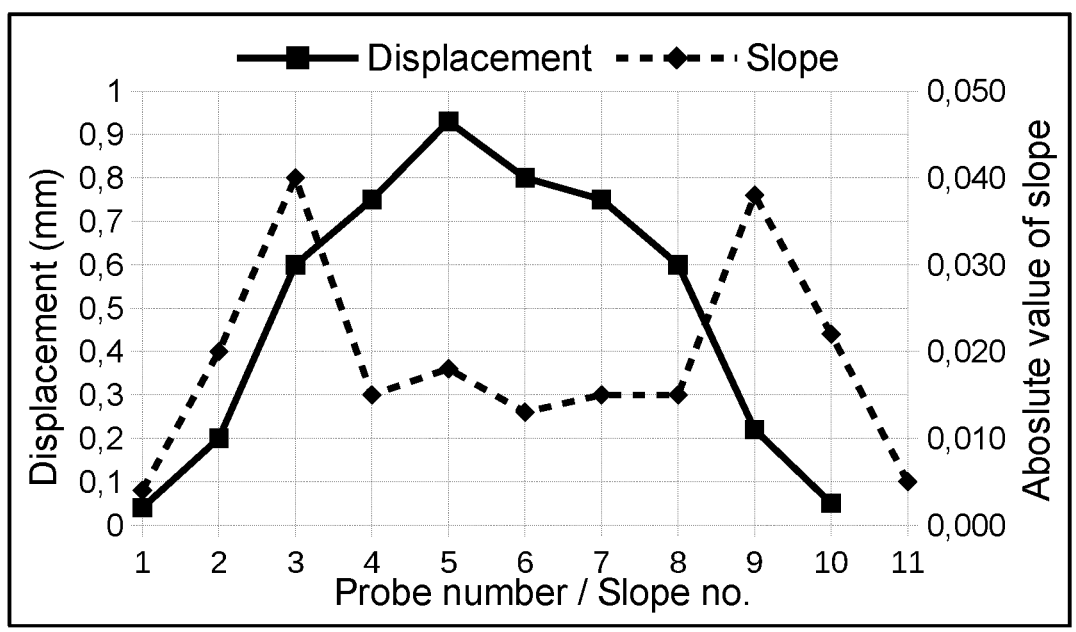

FIG. 5 illustrates the displacement of each of the ten probes in FIG. 4c relative to a line lined between the ends of the supporting legs 45a and 45b meeting the surface 32. Depending on the requirements, different thresholds can be used to determine whether the dis-placements are acceptable or not. For instance, if a displacement of 1 mm is acceptable, it can be seen from FIG. 5 that all points are within the acceptable limit, as they are all less than 1 mm. On the other hand, in case the displacement limit is 0.5 mm, probes 41c to 41h (probes 3-8 in FIG. 5) would have unacceptable degrees of displacement. In that case, an alert could be given to alert the user that unevenness criteria are met, i.e. the local surface does not meet the required specifications of evenness.

Another criterion involves evaluating the angle of the surface. FIG. 5 also illustrates the slope of the surface 32 based on the measurements. The slope at x=2 is calculated as $|\Delta y/\Delta x|$, where $\Delta y$ is the difference in height between of the probe end 43b of probe 2 41b and the probe end 43a of probe 1 41a as shown in FIG. 4d. The distance between the probes, $\Delta x$, is 1 cm. The slope at x=1 is calculated based on the difference in height between the end of probe 1 and supporting leg 45a. The same calculations apply across to the final Slope no. 11, which is calculated based on the difference in height between supporting leg 45b and the probe end of probe 10.

Based on the slopes, it may be determined that the surface 32 in FIG. 4c fulfils an unevenness criterion because slopes 3 and 9 exceed an acceptable value, such as 0.03, even if all displacements do not meet an unevenness criterion. As an example, if an unevenness criterion is met if the displacement exceeds 1 mm, then all probes are actually within the acceptable limit. However, the fact that the local slope between probe 41b and 41c is above 0.03 as calculated in accordance with the description above, means that the surface is considered not to meet the requirements. An indication may be given when this is determined.

The device 40 may alternatively provide signals representative of the electrical signals corresponding to the different probes to an external device, which may perform the actual determination of whether unevenness criteria are met or may display the positions or displacements based on the signals, and optionally provide an alert when unevenness criteria are met. The connection may be wired or wireless. In a wired embodiment, the external device may optionally provide electrical power to the device 40.

The examples of criteria given above are merely examples. The person skilled in the art will recognize that many variations and combinations may be used that still amount to determining that the surface is either sufficiently even or is too uneven.

Figure 6A:
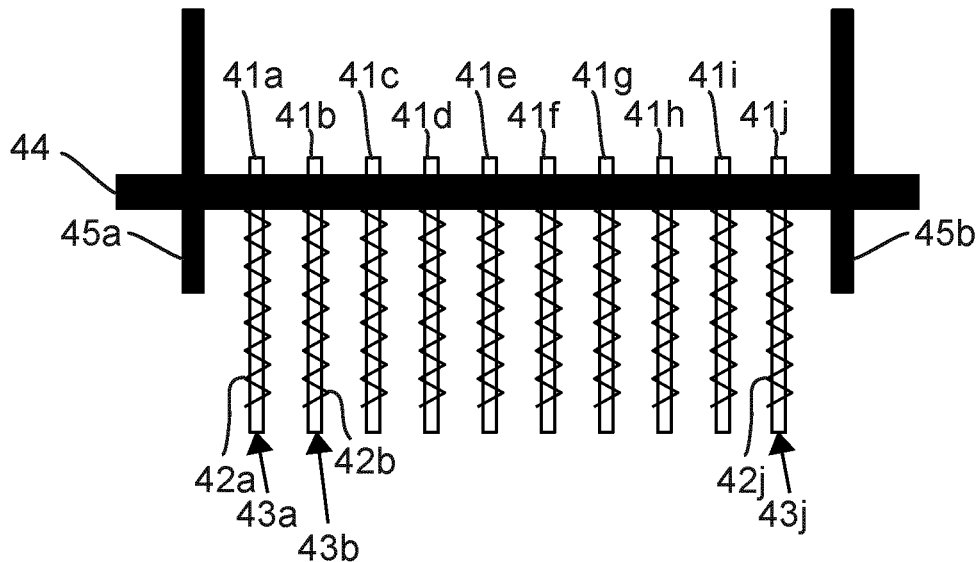
FIGS. 6a and 6b illustrate another measuring device in accordance with an embodiment of the invention as well as its use for characterising the shape of the surface of an item.
Figure 6B:
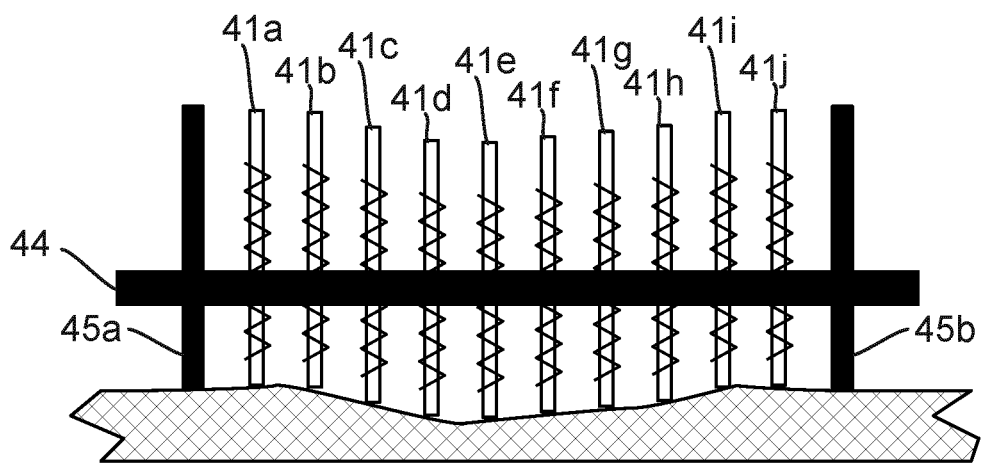

FIG. 6a illustrates the device 40 configured differently. The supporting legs 45a and 45b have been displaced upwards. Although movable legs are preferable, in some embodiments, they are permanently fixed. The probes 41a-41j extend beyond a line connecting the ends of the supporting legs 45a, 45b. In this configuration, the device is able to measure local dips in the surface. Dips may for instance be caused by pressure having been applied to the layup, as described in relation to FIG. 2d. A measurement is schematically shown in FIG. 6b. Just as for surfaces with a local wrinkle expressing itself as a locally raised area, the device may be used to characterize surfaces with dips. Corresponding criteria similar to those described above may be used. Even though FIGS. 6a and 6b are schematic, it can be seen that the device in FIGS. 6a and 6b can be used to measure both locally raised surfaces and local dips. By referencing to the supporting legs, it can be determined whether a given probe is probing a raised part or a dip, or even both.

Exemplary devices and methods are set out in the following items:

1. A measuring device (40) for characterising a shape of a surface of an item, the measuring device comprising:
    a frame comprising a holding frame (44),
    a first set of two or more probes (41a-41j) movably held in the holding frame, each probe having a respective probe end (43a-43j) for contacting the surface of the item, and
    electronic sensing means configured to provide for each probe a respective electrical signal representative of a position of the probe relative to the holding frame.

2. A measuring device in accordance with item 1, wherein each probe is connected to biasing means (42a-42j), such as a spring, configured to bias the probe to a corresponding neutral position relative to the holding frame.

3. A measuring device in accordance with item 2, wherein each probe is connected to corresponding biasing means and each biasing means is connected to a corresponding force sensor configured to provide a corresponding force sensor signal representative of a tension in the corresponding biasing means, and wherein the signal representative of the position of each probe is determined based at least in part on the corresponding force sensor signal.

4. A measuring device in accordance with any of the preceding items, configured to cause determining of a signal representative of an unevenness of the surface based on the electrical signals representative of the position of at least two probes in the first set of probes.

5. A measuring device in accordance with any of the preceding items, configured to cause determining of a signal representative of an unevenness of the surface, the signal representative of the unevenness being representative of an angle between 1) a straight line through the probe end of a first probe of the first set of probes and the probe end of a second probe of the first set of probes and 2) a straight line through the probe end of the second probe and the probe end of a third probe of the first set of probes.

6. A measuring device in accordance with any of the preceding items, configured to cause determining of a signal representative of an unevenness of the surface based at least on 1) the electrical signals representative of the positions of two of the probes relative to the holding frame and 2) a smallest distance between the probe ends of the two probes during measuring.

7. A measuring device in accordance with one of items 4-6, configured to cause determining whether the signal representative of the unevenness of the surface meets an unevenness criterion, and in the affirmative, to cause provision of an unevenness indication.

8. A measuring device in accordance with item 7, wherein the unevenness indication comprises an audible signal and/or a visual signal and/or a vibration signal.

9. A measuring device in accordance with any of the preceding items, wherein at least a subset of the first set of probes is arranged in a one-dimensional array.

10. A measuring device in accordance with any of the preceding items, wherein at least a subset of the first set of probes is arranged in a two-dimensional array.

11. A measuring device in accordance with any of the preceding items, wherein each probe is movably maintained in a respective position by a frictional force exceeding a force corresponding to the standard acceleration of free fall, g0.

12. A measuring device in accordance with any of the preceding items, wherein the frame further comprises one or more fixed or fixatable supporting legs (45a, 45b) for supporting the measuring device on the surface of the item during obtaining of the electrical signals representative of the positions of the probes relative to the holding frame (44).

13. A measuring device in accordance with any of the preceding items, wherein the device is configured such that a weight of the frame exceeds a maximum total force that the first set of probes can exert on a first portion of a surface while the supporting legs are in contact with a second portion of said surface.

14. A measuring device in accordance with any of the preceding items, wherein the probe ends of two probes of the first set of probes are separated by a distance of at least 10 cm, such as at least 20 cm, an average distance between probes optionally being in the range 0.5-1.5 cm.

15. A measuring device in accordance with any of the preceding items, operable to communicate to an external device
a signal representative of the electrical signals corresponding to at least two of the probes, and/or
a signal representative of an unevenness of the surface of the item determined based on the electrical signals representative of the positions of at least two of the probes.

16. A measuring device in accordance with any of the preceding items, wherein the electrical signals corresponding to at least two of the probes are obtained using corresponding linear variable differential transformers or based on respective resistance measurements.

17. A method for characterising a shape of a surface of an item, comprising:
providing two or more probes movably held in a holding frame, each probe having a corresponding probe end for contacting the surface of the item,
bringing at least two of the probe ends into contact with the surface of the item,
obtaining electrical signals representative of corresponding positions of at least two of the probes relative to the holding frame.

18. A method in accordance with item 17, further comprising obtaining the respective electrical signals at least when the holding frame is at a first position relative to the item and when the holding frame is at a second position relative to the item different from the first position.

19. A method in accordance with item 18, further comprising moving the holding frame from the first position to the second position while at least two of the probes are in contact with the surface of the item.

20. A method in accordance with any of items 17-19, further comprising:
determining a signal representative of an unevenness of the surface of the item based on the electrical signals representative of the positions of at least two of the probes relative to the holding frame.

21. A method in accordance with item 20, further comprising determining whether the signal representative of an unevenness of the surface meets an unevenness criterion, and in the affirmative, to cause provision of an unevenness indication.

22. A method in accordance with item 21, wherein the unevenness indication comprises an audible signal and/or a visual signal and/or a vibration signal.

23. A method in accordance with any of items 17-22, further comprising storing data representing at least a part, such as all, of the obtained electrical signals on an electronic storage medium.

24. A method for preparing a fibre layup for a fibre-reinforced wind turbine blade, comprising:
laying up fibre material in a mould,
characterising a surface of the fibre material layup using a device in accordance with any of items 1-16 or a method in accordance with any of items 17-23.

25. A method for calibrating a device in accordance with item 12, comprising:
placing the device on the one or more supporting legs on a surface and storing reference information including storing a reference signal representative of the electrical signal provided by the electronic sensing means for each probe in a second set of one or more of the probes in the first set of probes, such as all the probes in the first set of probes, and
during subsequent use, determining for at least one probe in the second set of probes, such as for each of all the probes in the second set of probes, a signal representative of a difference between the electrical signal measured during said use and the corresponding reference signal.

LIST OF REFERENCE NUMERALS 2 wind turbine
4 tower
6 nacelle
8 hub
10 wind turbine blade
14 blade tip
21 wind turbine blade shell part mould
22 mould surface
25 section of mould
31 fibre layup
32 fibre wrinkle
33 wrinkled region
41a-41j probes
42a-42j biasing means, such as springs
43a-43j probe ends
44 holding frame
45a-45b supporting legs
46 detail of probes during measurement
Δx distance between probes
Δy displacement difference
L largest distance between ends of supporting legs
A-A cross-section through fibre wrinkle

The invention claimed is:
1. A measuring device (40) for characterizing a shape of a surface of an item, the measuring device comprising:
a frame comprising a holding frame (44);
a first set of three or more probes (41a-41j) movably held in the holding frame, each of the probes having a respective probe end (43a-43j) for contacting the surface of the item; and electronic sensing means configured to provide for each of the probes a respective electrical signal representative of a position of the probe relative to the holding frame, wherein the device is further configured to cause determination of an unevenness signal representative of an unevenness of the surface, the unevenness signal being representative of an angle between 1) a straight line through the probe end of a first probe of the first set of probes and the probe end of a second probe of the first set of probes and 2) a straight line through the probe end of the second probe and the probe end of a third probe of the first set of probes.

2. The measuring device in accordance with claim 1, wherein each of the probes is connected to biasing means (42a-42j), such as a spring, configured to bias the probe to a corresponding neutral position relative to the holding frame.

3. The measuring device in accordance with claim 2, wherein each of the probes is connected to corresponding biasing means and each biasing means is connected to a corresponding force sensor configured to provide a corresponding force sensor signal representative of a tension in the corresponding biasing means, and wherein the signal representative of the position of each of the probes is determined based at least in part on the corresponding force sensor signal.

4. The measuring device in accordance with claim 3, configured to cause determining whether the signal representative of the unevenness of the surface meets an unevenness criterion, and in the affirmative, to cause provision of an unevenness indication.

5. The measuring device in accordance with claim 4, wherein the unevenness indication comprises an audible signal and/or a visual signal and/or a vibration signal.

6. The measuring device in accordance with claim 1, configured to cause determining of a signal representative of an unevenness of the surface based on the electrical signals representative of the position of at least two probes in the first set of probes.

7. The measuring device in accordance with claim 1, configured to cause determining of a signal representative of an unevenness of the surface based at least on 1) the electrical signals representative of the positions of two of the probes relative to the holding frame and 2) a smallest distance between the probe ends of the two probes during measuring.

8. The measuring device in accordance with claim 1, wherein at least a subset of the first set of probes is arranged in a one-dimensional array.

9. The measuring device in accordance with claim 1, wherein at least a subset of the first set of probes is arranged in a two-dimensional array.

10. The measuring device in accordance with claim 1, wherein each of the probes is movably maintained in a respective position by a frictional force exceeding a force corresponding to the standard acceleration of free fall, g0.

11. The measuring device in accordance with claim 1, wherein the frame further comprises one or more fixed or fixable supporting legs (45a, 45b) for supporting the measuring device on the surface of the item during obtaining of the electrical signals representative of the positions of the probes relative to the holding frame (44).

12. A method for calibrating a device in accordance with claim 11, the method comprising:

placing the device on the one or more supporting legs on a surface and storing reference information including storing a reference signal representative of the electrical signal provided by the electronic sensing means for each of the probes in a second set of one or more of the probes in the first set of probes, such as all the probes in the first set of probes, and during subsequent use, determining for at least one probe in the second set of probes, such as for each of all the probes in the second set of probes, a signal representative of a difference between the electrical signal measured during said use and the corresponding reference signal.

13. The measuring device in accordance with claim 1, wherein the device is configured such that a weight of the frame exceeds a maximum total force that the first set of probes can exert on a first portion of a surface while the supporting legs are in contact with a second portion of said surface.

14. The measuring device in accordance with claim 1, wherein the probe ends of two probes of the first set of probes are separated by a distance of at least 10 cm.

15. The measuring device in accordance with claim 1, operable to communicate to an external device a signal representative of the electrical signals corresponding to at least two of the probes, and/or a signal representative of an unevenness of the surface of the item determined based on the electrical signals representative of the positions of at least two of the probes.

16. The measuring device in accordance with claim 1, wherein the electrical signals corresponding to at least two of the probes are obtained using corresponding linear variable differential transformers or based on respective resistance measurements.

17. A method for characterizing a shape of a surface of an item, comprising:

providing three or more probes movably held in a holding frame, each of the probes having a corresponding probe end for contacting the surface of the item;

bringing at least three of the probe ends into contact with the surface of the item;

obtaining electrical signals representative of corresponding positions of at least two of the probes relative to the holding frame; and determining an unevenness signal representative of an unevenness of the surface, the unevenness signal being representative of an angle between 1) a straight line through the probe end of a first probe of the first set of probes and the probe end of a second probe of the first set of probes and 2) a straight line through the probe end of the second probe and the probe end of a third probe of the first set of probes.

18. The method in accordance with claim 17, further comprising obtaining the respective electrical signals at least when the holding frame is at a first position relative to the item and when the holding frame is at a second position relative to the item different from the first position.

19. The method in accordance with claim 18, further comprising moving the holding frame from the first position to the second position while at least two of the probes are in contact with the surface of the item.

20. The method in accordance with claim 17, further comprising:

determining an unevenness signal representative of an unevenness of the surface of the item based on the electrical signals representative of the positions of at least two of the probes relative to the holding frame.

21. The method in accordance with claim 17, further comprising determining whether the unevenness signal representative of an unevenness of the surface meets an unevenness criterion, and generating an unevenness indication when the unevenness signal meets the unevenness criterion.

22. The method in accordance with claim 21, wherein the unevenness indication comprises an audible signal and/or a visual signal and/or a vibration signal.

23. The method in accordance with claim 17, further comprising storing data representing at least a part, such as all, of the obtained electrical signals on an electronic storage medium.

24. A method for preparing a fibre layup for a fibre-reinforced wind turbine blade, comprising:
    laying up fibre material in a mould;
    characterizing a surface of the fibre material layup using a device in accordance with claim 1 or a method in accordance with claim 17.

25. The method in accordance with claim 24, further comprising:
    monitoring whether an unevenness is formed during laying up the fibre material by determining that the unevenness signal meets an unevenness criterion; and
    rearranging the fibre material to eliminate the unevenness if the unevenness signal meets the unevenness criterion.

* * * * *